US007260039B2

(12) United States Patent
Suh

(10) Patent No.: US 7,260,039 B2
(45) Date of Patent: Aug. 21, 2007

(54) HIGH-DENSITY MULTI-LAYER OPTICAL DISC, METHOD FOR RECORDING DATA THEREON ON LAYER-BY-LAYER BASIS, AND METHOD FOR MANAGING SPARE AREAS THEREOF

(75) Inventor: Sang Woon Suh, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/485,911

(22) PCT Filed: Jun. 5, 2003

(86) PCT No.: PCT/KR03/01108

§ 371 (c)(1), (2), (4) Date: Oct. 8, 2004

(87) PCT Pub. No.: WO03/105136

PCT Pub. Date: Dec. 18, 2003

(65) Prior Publication Data

US 2005/0036426 A1 Feb. 17, 2005

(30) Foreign Application Priority Data

Jun. 7, 2002 (KR) ...................... 10-2002-0032051
Jun. 7, 2002 (KR) ...................... 10-2002-0032052

(51) Int. Cl.
*G11B 7/00* (2006.01)

(52) U.S. Cl. .................................. 369/53.17; 369/53.2

(58) Field of Classification Search ............. 369/53.17
See application file for complete search history.

(56) References Cited

U.S. PATENT DOCUMENTS 5,914,928 A * 6/1999 Takahashi ................ 369/47.14

(Continued)

FOREIGN PATENT DOCUMENTS

JP 09-251721 9/1997

(Continued)

OTHER PUBLICATIONS

Korean Search Report, PCT/KR03/01108, Sep. 24, 2003.

*Primary Examiner*—Wayne Young
*Assistant Examiner*—Lixi Chow
(74) *Attorney, Agent, or Firm*—Harness, Dickey & Pierce, P.L.C.

(57) ABSTRACT

A high-density multi-layer optical disc, a method for recording data thereon on a layer-by-layer basis, and a method for managing spare areas thereof. In a high-density multi-layer optical disc, having a plurality of recording layers formed thereon, such as a Blu-ray disc rewritable (BD-RE) dual layer, management information is recorded and managed appropriately to the multiple layers so that data can be recorded in a state where the recording layers are linked to each other or the recording layers are separated from each other. Inner and outer spare areas are separately assigned to each of the recording layers formed on the high-density multi-layer optical disc. The management information is recorded and managed appropriately to the multiple layers so that the data can be recorded in a state where the spare areas of the recording layers must be used together irrespective of the recording layers or used separately on the layer-by-layer basis. The recording layers can be effectively used and managed, and the spare areas separately assigned to the respective recording layers can be effectively used and managed.

25 Claims, 9 Drawing Sheets

| DDS (Rewritable) |
| --- |
| DDS identifier = "DS" |
| ⋮ |
| Reserved |
| First PSN of Defect List for Layer 0 (P_DFL0) |
| First PSN of Defect List for Layer 1 (P_DFL1) |
| Reserved |
| Location of LSN 0 of User Data Area for Layer 0 |
| Location of LSN 0 of User Data Area for Layer 1 |
| Last LSN of User Data Area for Layer 0 |
| Last LSN of User Data Area for Layer 1 |
| Inner Spare Area 0 size (ISA0_size) |
| Outer Spare Area 0 size (OSA0_size) |
| Inner Spare Area 1 size (ISA1_size) |
| Outer Spare Area 1 size (OSA1_size) |
| Spare Area Full Flags |
| Reserved |
| ⋮ |
| Last Verified Address (LVA) Pointer for Layer 0 |
| Last Verified Address (LVA) Pointer for Layer 0 |
| Reserved |
| ⋮ |

| Bit | Spare Area Full Flags |
| --- | --- |
| b0 | Inner Spare Area 0 Full |
| b1 | Outer Spare Area 0 Full |
| b2 | Inner Spare Area 1 Full |
| b3 | Outer Spare Area 1 Full |
| b4, b5 | Spare Area State |
| b6, b7 | Reserved |

| b5 | b4 | Meaning |
| --- | --- | --- |
| 0 | 0 | Spare-area separate use on layer-by-layer basis |
| 1 | 1 | Spare-area linkage use |
| 0 | 1 | layer 0's spare area full |
| 1 | 0 | layer 1's spare area full |

U.S. PATENT DOCUMENTS 6,295,257 B1 * 9/2001 Ito et al. .................. 369/47.14
6,370,102 B1 * 4/2002 Mons et al. .................. 369/94
6,385,736 B1 * 5/2002 Jeong et al. ................... 714/8
6,469,978 B1 * 10/2002 Ohata et al. ............. 369/275.3
6,621,786 B2 * 9/2003 Mons et al. .................. 369/94
2001/0026511 A1 * 10/2001 Ueda et al. .............. 369/47.14
2003/0137909 A1 * 7/2003 Ito et al. .................. 369/47.14
2003/0137910 A1 * 7/2003 Ueda et al. .............. 369/47.14

FOREIGN PATENT DOCUMENTS

JP 09251721 * 9/1997
JP 12-048491 2/2000
JP 12-195181 7/2000
JP 12-195182 7/2000
JP 12-195183 7/2000

* cited by examiner

BD-RW Single Layer (100)

| b5 | b4 | Meaning |
|---|---|---|
| 0 | 0 | Spare-area separate use on layer-by-layer basis |
| 1 | 1 | Spare-area linkage use |
| 0 | 1 | layer 0's spare area full |
| 1 | 0 | layer 1's spare area full |

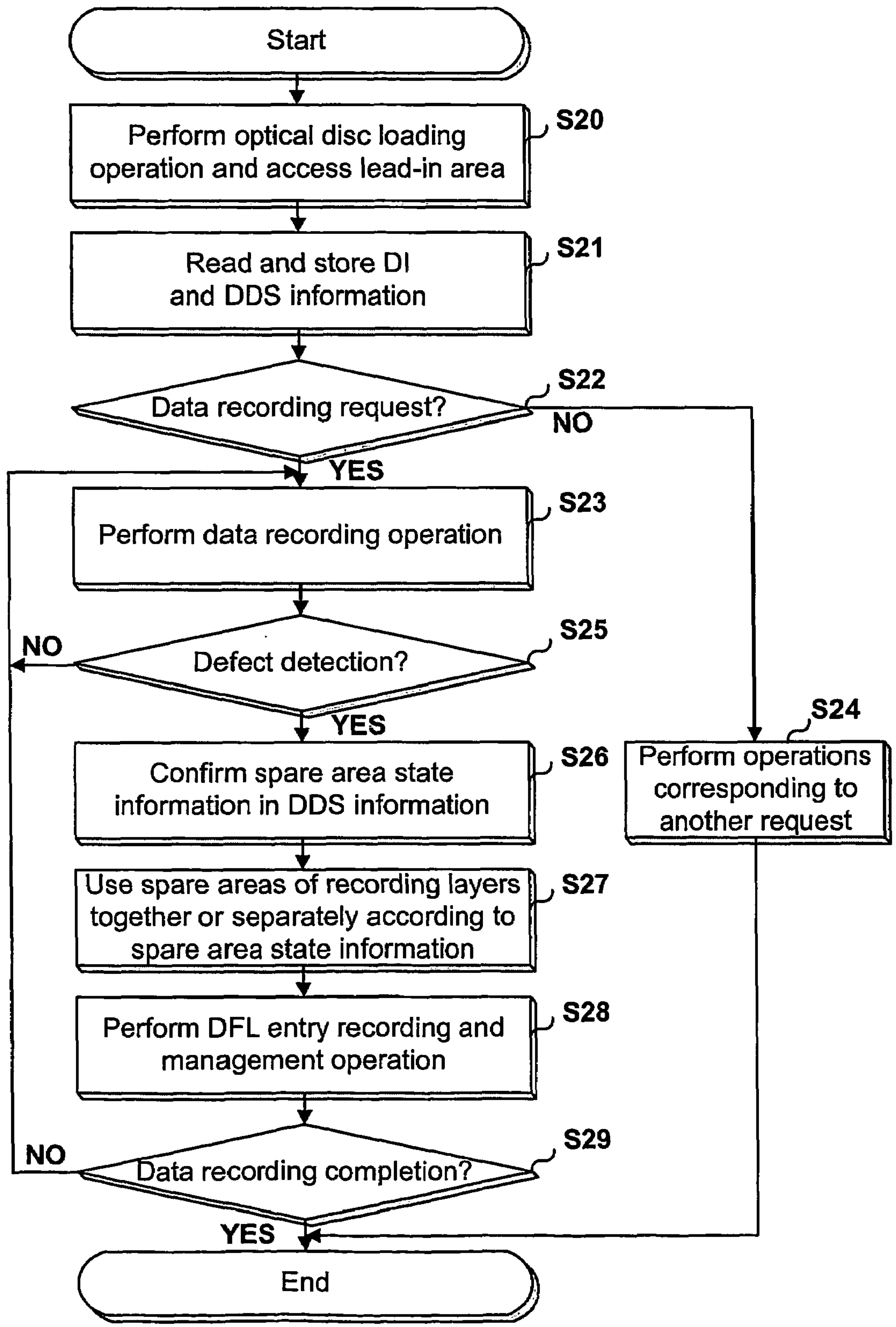
FIG. 8
Start
Perform optical disc loading operation and access lead-in area
S20
Read and store DI and DDS information
S21
Data recording request?
S22
NO
YES
Perform data recording operation
S23
Defect detection?
S25
NO
YES
Confirm spare area state information in DDS information
S26
Perform operations corresponding to another request
S24
Use spare areas of recording layers together or separately according to spare area state information
S27
Perform DFL entry recording and management operation
S28
Data recording completion?
S29
NO
YES
End

HIGH-DENSITY MULTI-LAYER OPTICAL DISC, METHOD FOR RECORDING DATA THEREON ON LAYER-BY-LAYER BASIS, AND METHOD FOR MANAGING SPARE AREAS THEREOF

BACKGROUND OF THE INVENTION

1. Field of the Invention

The present invention relates to a high density multi-layer optical disc on which multiple layers are formed, a method for recording data thereon on a layer-by-layer basis, and a method for managing spare areas thereof.

2. Description of the Related Art

As standardization of a high-density rewritable optical disc, e.g.; a Blu-ray disc rewritable (BD-RE), capable of storing high-quality video and audio rapidly progresses, it is expected that related products will be developed, commercialized and supplied.

A conventional BD-RE single layer 100 is shown in FIG. 1. As shown in FIG. 1, there is a distance of approximately 0.1 mm between a recording layer and the surface of a transparent film being arranged between the recording layer and an objective lens (OL) 11 of an optical pick-up.

When an optical disc apparatus for reading and reproducing data recorded on the recording layer of the BD-RE single layer 100 or recording data thereon determines that a defect is detected on the layer 100 while performing a data recording operation, the optical disc apparatus records the data in an inner spare area (ISA) or outer spare area (OSA) separately assigned to a data area as shown in FIG. 2, in place of a data area.

Further, the optical disc apparatus generates a defect list (DFL) entry needed for identifying a cluster associated with a recording unit block {RUB} recorded in the spare area in place of a data area, and performs a recording and management operation for the generated DFL entry.

As shown in FIG. 2, management information associated with the spare areas is contained and recorded in a field of rewritable disc definition structure (DDS) information of a lead-in area. The DDS information includes information items associated with the first physical sector number (PSN) of the DFL (P_DFL), a location of a logical sector number (LSN) 0 of in user data area, the last LSN of the user data area, a size of the ISA (ISA_size), a size of the OSA (OSA_Size), spare area full flags indicating whether the respective spare areas are full, the last verified address (LVA) pointer, etc.

The spare area full flags are recorded by one byte consisting of a 1-bit ISA full flag, a 1-bit OSA full flag and 6-bit reserved information assigned to a reserved area.

As described above, when the defect is detected in the data area while the optical disc apparatus records data in the data area, the optical disc apparatus searches for the spare area full flags contained and recorded in the DDS information field, selects the ISA or OSA in which the data can be recorded, and performs a sequence of data recording operations for recording the data in the selected spare area.

A high-density dual-layer optical disc, i.e., a BD-RE dual layer, capable of recording twice as much video and audio data as the BD-RE single layer, has been developed. As shown in FIG. 3, there is a distance d2 between the first recording layer (Layer 0) and the second recording layer (Layer 1) formed in the BD-RE dual layer 200. The first and second recording layers are formed at a location, within the BD-RE dual layer 200, having a bias toward the OL 11 of the optical pick-up.

The first and second recording layers of the BD-RE dual layer 200 are linked to each other so that the large-capacity data can be recorded. The ISA and OSA can be separately assigned to each of the data areas associated with the first and second recording layers. However, there is not yet provided a method for efficiently employing the first and second recording layers of the BD-RE dual layer 200 on a layer-by-layer basis. Moreover, there is not yet provided a method for efficiently employing and managing a plurality of spare areas separately assigned to each recording layer.

SUMMARY OF THE INVENTION

Therefore, it is one object of the present invention to provide a high-density multi-layer optical disc such as a Blu-ray disc rewritable (BD-RE) dual layer, and a method for recording data thereon on a layer-by-layer basis, which can use a plurality of recording layers formed on the disc together or separately and hence can efficiently record and manage the data of the recording layers.

It is another object of the present invention to provide a high-density multi-layer optical disc such as a Blu-ray disc rewritable (BD-RE) dual layer, and a method for managing spare areas thereof, which can assign inner and outer spare areas to each of multiple recording layers formed on the disc, and use the spare areas assigned to the respective recording layers together or separately.

In accordance with one aspect of the present invention, the above and other objects can be accomplished by the provision of a high-density multi-layer optical disc having a plurality of recording layers formed thereon, comprising: at least one of spare areas separately assigned to each of the recording layers, the spare areas being usable when a defect is detected and to be managed; and at least one specified area contained in at least one of recording layers, the specified area having management information indicating whether the recording layers must be used together or separately.

In accordance with another aspect of the present invention, there is provided a high-density multi-layer optical disc having a plurality of recording layers formed thereon, comprising: an inner spare area and an outer spare area assigned to each data area, while each data area being assigned to each of the recording layers; and management information, additionally recorded in a lead-in area, indicating whether the spare areas of the recording layers must be used together irrespective of the recording layers or used separately on a layer-by-layer basis.

In accordance with another aspect of the present invention, there is provided a method for recording data on a high-density multi-layer optical disc on a layer-by-layer basis, comprising the steps of: (a) reading disc definition structure (DDS) information recorded in at least one specified area of the high-density multi-layer optical disc, and storing the read information in a memory, wherein the disc definition structure information includes control information for indicating whether recording layers must be used together or separately; (b) determining whether to use the recording layers together or separately based on the control information; and (c) performing the data recording operation and/or a defect management operation according to a result of the determination.

In accordance with another aspect of the present invention, there is provided a method for managing spare areas of a high-density multi-layer optical disc, comprising the steps of: (a) detecting a defect within a data area of the high-density multi-layer optical disc while the data is recorded in the data area; (b) confirming spare area management information read from a lead-in area of the high-density multi-layer optical disc, when the defect is detected; and (c) determining whether spare areas separately assigned to a current recording layer must be used together with other spare areas separately assigned to another recording layer or only the spare areas of the current recording layer must be used separately, according to the confirmed spare area management information.

In accordance with another aspect of the present invention, there is provided a method for managing spare areas of a high-density multi-layer optical disc, comprising the steps of: (a) reading control information stored in an area of the optical recording medium, said control information including indication information for indicating whether or not at least two layers are associated with each other to record data to or read data from the recording medium; and (b) controlling recording or reading based on the control information.

In accordance with another aspect of the present invention, there is provided a method for managing spare areas of a high-density multi-layer optical disc, comprising the steps of: (a) recording control information on an area of the optical recording medium, said control information including indication information for indicating whether or not at least two recording layers are associated with each other for data to be recorded or read; and (b) controlling recording or reading based on the control information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

FIG. 8 is a flowchart illustrating a method for managing spare areas of the high-density dual-layer optical disc in accordance with the present invention.

Features, elements, and aspects of the invention that are referenced by the same numerals in different figures represent the same, equivalent, or similar features, elements, or aspects in accordance with one or more embodiments.

DESCRIPTION OF THE PREFERRED EMBODIMENTS

A high-density multi-layer optical disc, a method for recording data thereon on a layer-by-layer basis, and a method for managing spare areas thereof in accordance with preferred embodiments of the present invention will be described in detail with reference to the annexed drawings.

Figure 1:
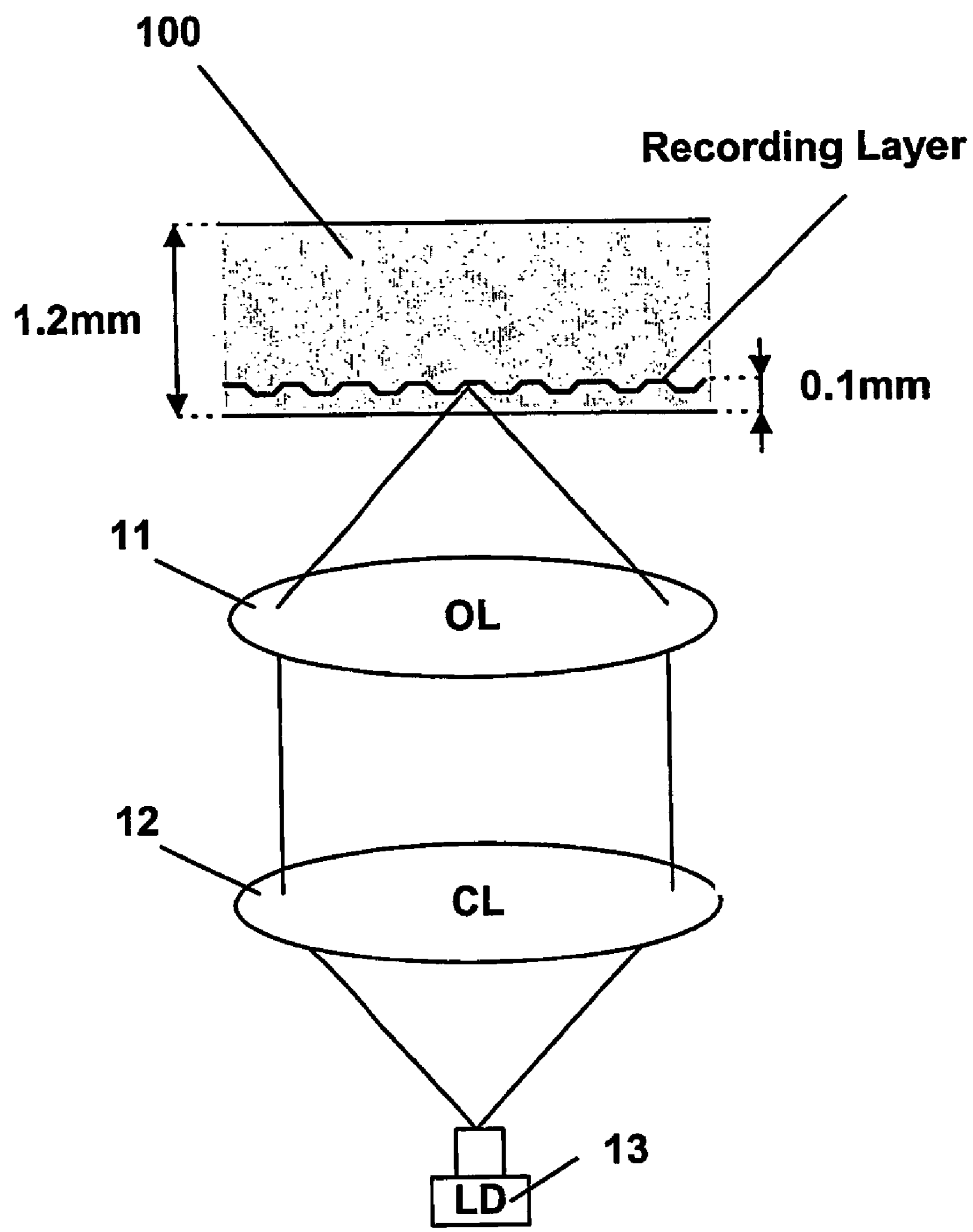
FIG. 1 is a view illustrating the structure of a conventional Blu-ray disc rewritable (BD-RE)
Figure 2:
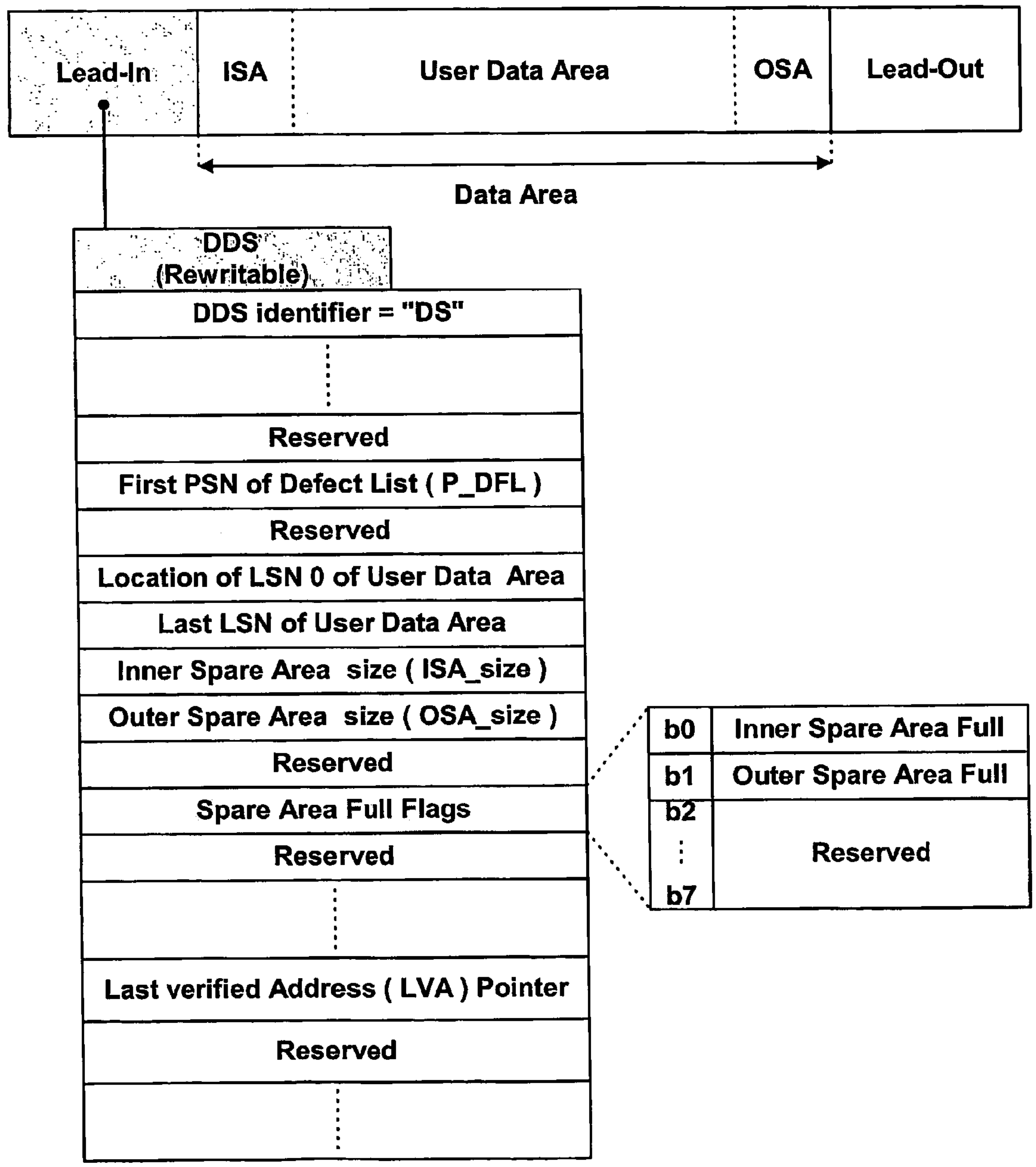
FIG. 2 is a table illustrating disc definition structure (DDS) information recorded and managed in a lead-in area of the conventional BD-RE.
Figure 3:
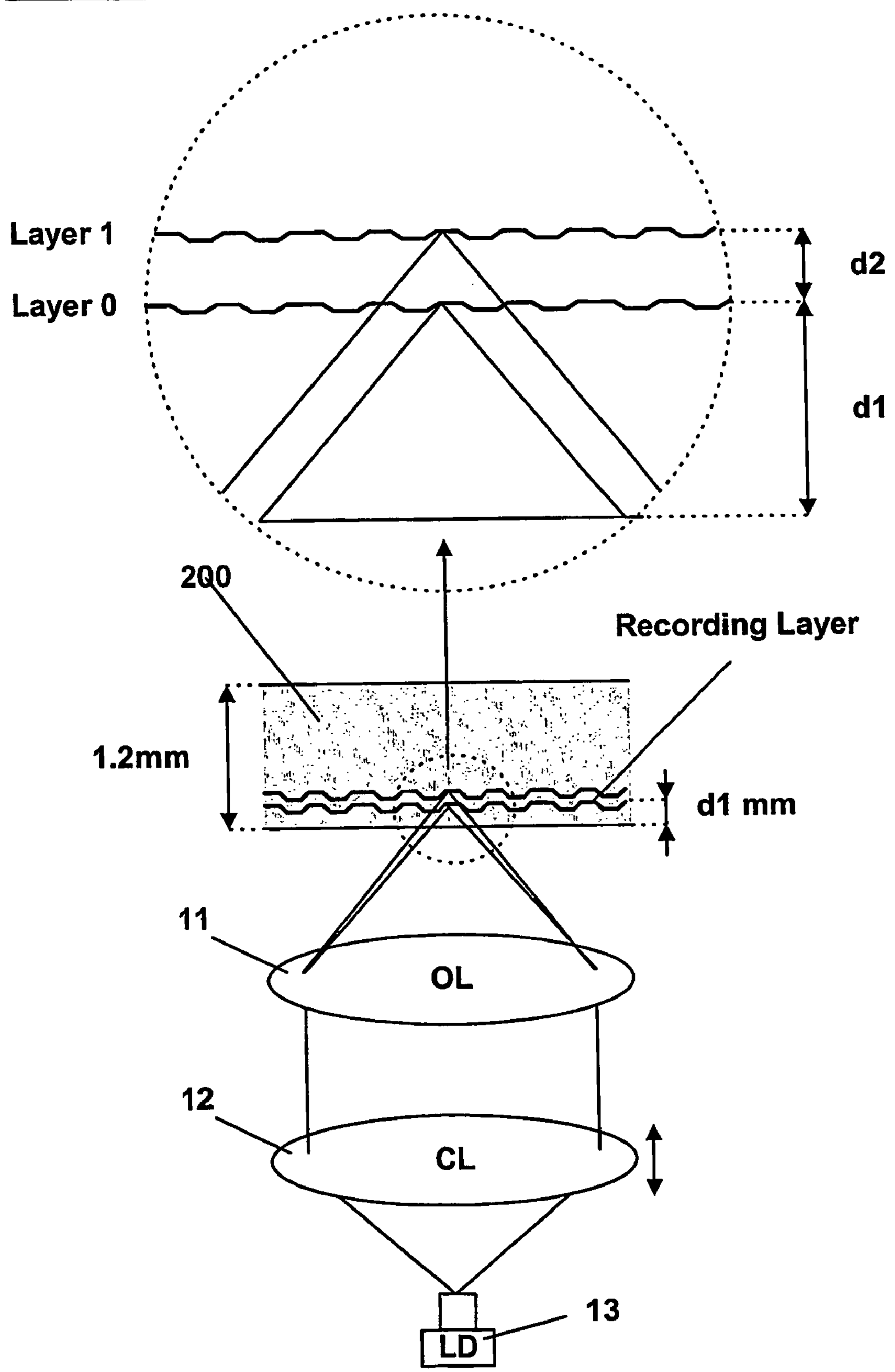
FIG. 3 is a view illustrating the structure of a high-density dual-layer optical disc.
Figure 4:
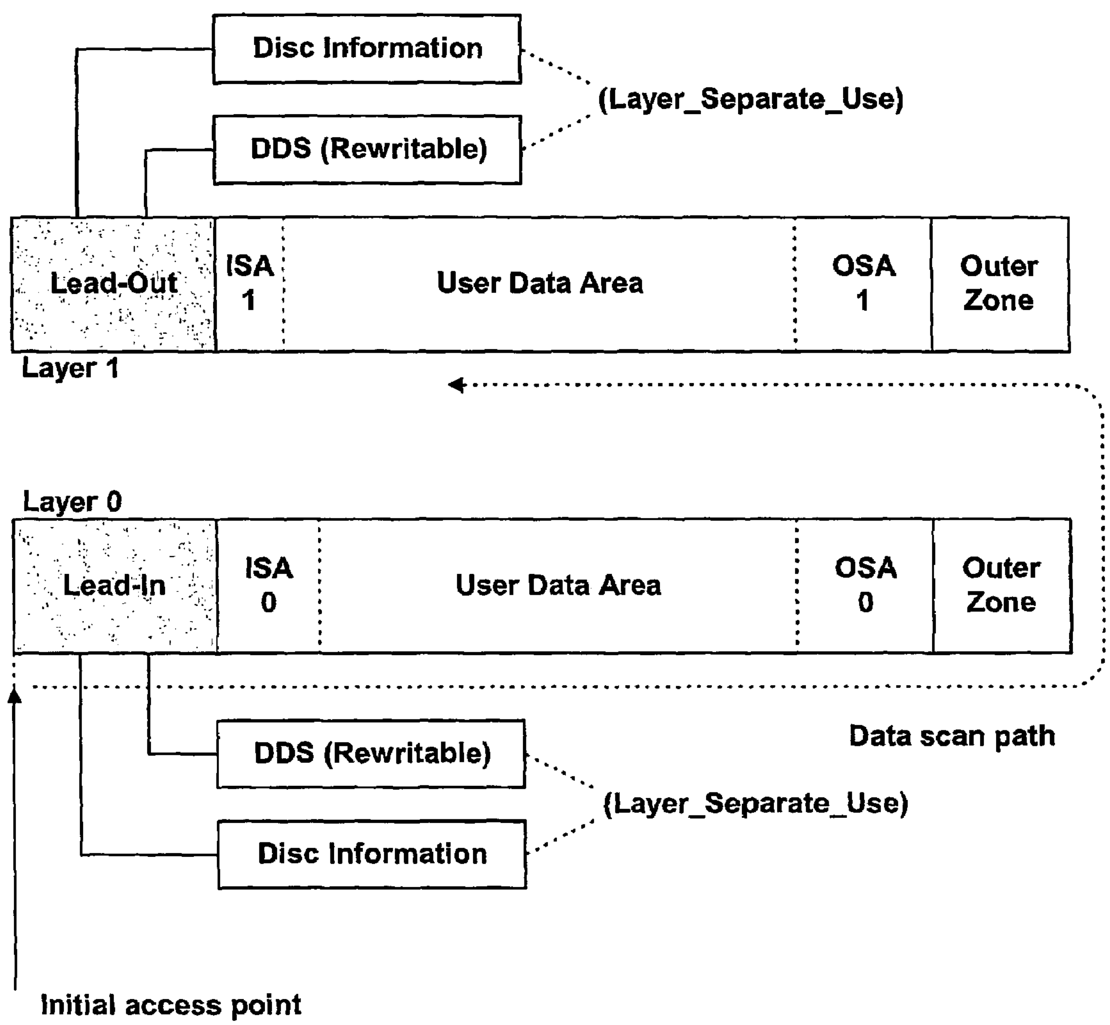
FIG. 4 is a view illustrating a state where. disc information (DI) and disc definition structure (DDS) information are contained in lead-in and lead-out areas of the high-density dual-layer optical disc in accordance with the present invention.

First, as shown in FIG. 4, a lead-in area is assigned to the first recording layer (Layer 0) and a lead-out area is assigned to the second recording layer (Layer 1) in the high-density multi-layer optical disc, e.g., a Blu-ray disc rewritable (BD-RE) dual layer 200, in accordance with the present invention. The first inner spare area (ISA0) and first outer spare area (OSA0) are separately assigned to a data area for the first recording layer. The second ISA (ISA1) and second OSA (OSA1) are separately assigned to a data area for the second recording layer.

Management information needed for managing a plurality of spare areas separately assigned to the data area for each recording layer and defect management address (DMA) information needed for managing a defect are rewritable disc definition structure (DDS) information. The rewritable DDS information can be recorded and managed in the lead-in area of the first recording layer and the lead-out area of the second recording layer.

Figure 5:
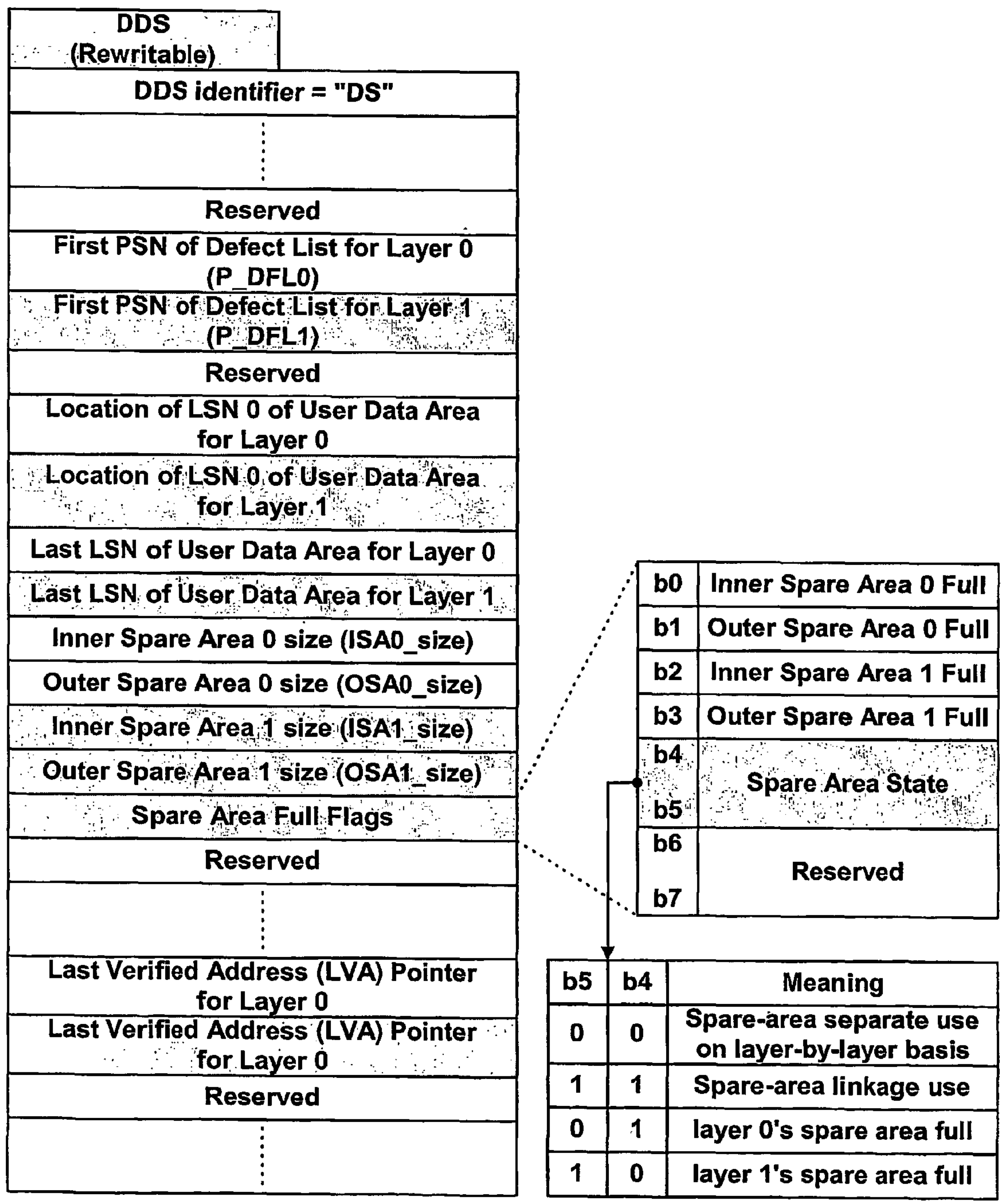
FIG. 5 is a table illustrating the DDS information recorded and managed in each of the lead-in and lead-out areas of the high-density dual-layer optical disc in accordance with the present invention.

As shown in FIG. 5, the DDS information includes information items associated with the first physical sector number (PSN) of a defect list (DFL) for the first recording layer (Layer 0) (P_DFL0), the first PSN of a DFL for the second recording layer (Layer 1) (P_DFL1), a location of a logical sector number (LSN) 0 of a user data area for the first recording layer, a location of a logical sector number (LSN) 0 of a user data area for the second recording layer, the last LSN of the user data area for the first recording layer, the last LSN of the user data area for the second recording layer, a size of the first ISA (ISA0_size), a size of the second OSA (OSA1_size), spare area full flags indicating whether the respective spare areas are full, the last verified address (LVA) pointer for the first recording layer, the LVA pointer for the second recording layer, etc.

The DDS information contains the spare area management information and DMA information on the layer-by-layer basis so that the first and second recording layers can be used and managed separately.

Disc information (DI), contained and recorded in the lead-in area along with the DDS information, includes layer separate use (Layer_Separate_Use) information indicating whether the first and second recording layers are used separately or together. For example, the layer separate use information can be recorded and managed as a 1-bit flag. Where Layer_Separate_Use="1", the optical disc apparatus separates the respective recording layers to record data on only an arbitrary recording layer. Meanwhile, where Layer_ Separate Use="0", the optical disc apparatus links the respective recording layers to consecutively record data on the linked recording layers.

The spare area full flags contained in the DDS information field includes the first inner spare area full flag (b0) using one bit, the first outer spare area full flag (b1) using one bit, the second inner spare area full flag (b2) using one bit, the second outer spare area full flag (b3) using one bit, and 2-bit area state information (b5b4).

For example, where "b5b4"=00, the spare area state information indicates that the first inner and outer spare areas assigned to the first recording layer and the second inner and outer spare areas assigned to the second recording layer must be used and managed, separately on the layer-by-layer basis. Meanwhile, where "b5b4"=11, the spare area state information indicates that the first inner and outer spare areas assigned to the first recording layer and the second inner and outer spare assigned to the second recording layer must be used and managed together.

Further, where "b5b4"=01, the spare area state information indicates that the first inner and outer spare areas assigned to the first recording layer are full. Meanwhile, where "b5b4"=10, the spare area state information indicates that the second inner and outer spare areas separately assigned to the second recording layer are full.

Thus, the optical disc apparatus confirms the spare area state information contained and recorded in the above-described DDS information field. Then, the optical disc apparatus uses the multiple spare areas assigned to the first and second recording layers separately or together on the basis of the confirmed information.

Figure 6:
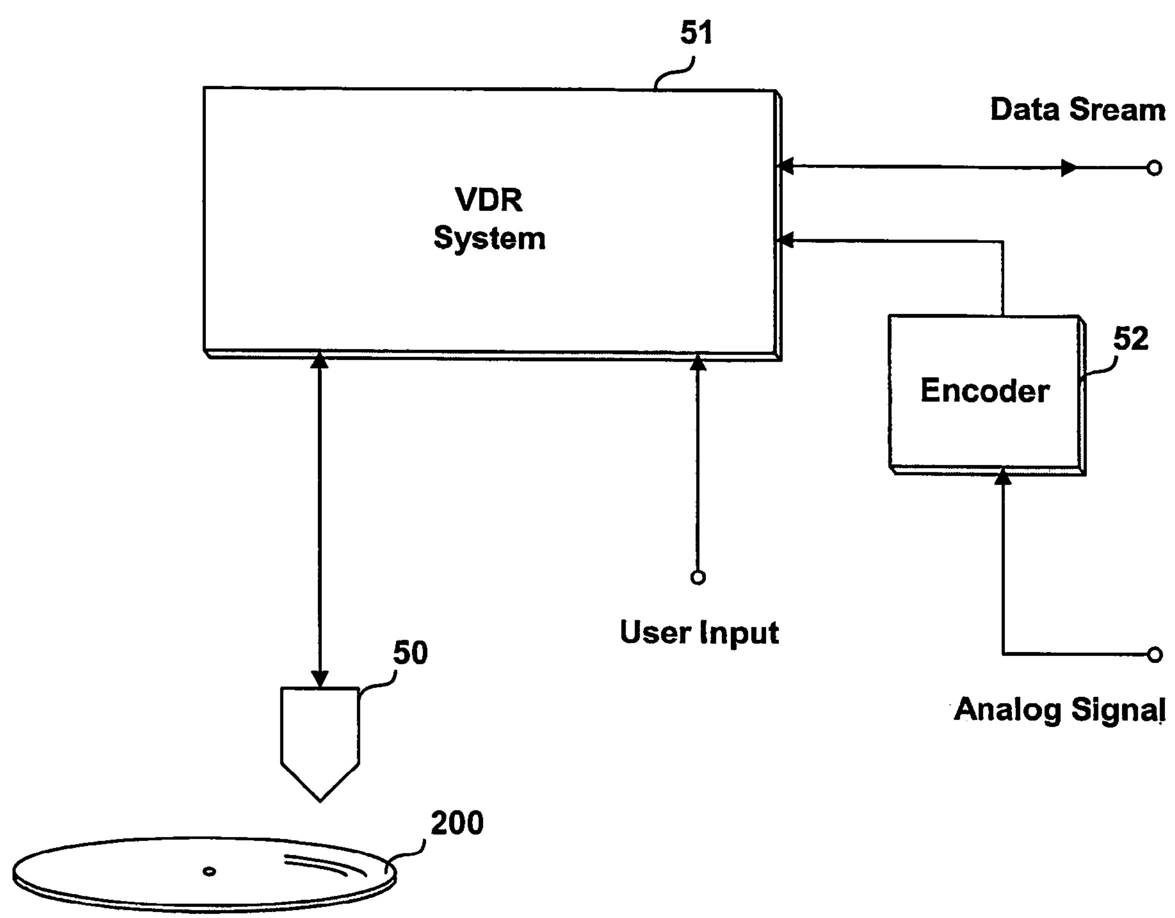
FIG. 6 is a view illustrating the configuration of an optical disc apparatus to which a method for recording data on the disc on a layer-by-layer basis and managing spare areas of the disc is applied in accordance with the present invention.

FIG. 6 is a view illustrating a configuration of the optical disc apparatus to which a method for managing the spare areas of the disc is applied in accordance with the present invention. For example, an optical disc apparatus such as a video disc recorder (VDR) for recording or reproducing data of a BD-RE dual layer includes an optical pick-up 50 for reading data recorded on a high-density multi-layer optical disc 200 such as the BD-RE dual layer or recording a data stream corresponding to a processed signal; a VDR system 51 for performing a signal processing operation so that a signal of the data read by the optical pick-up 50 can be reproduced or converting an externally inputted data stream into a data stream appropriate for recording; and an encoder 52 for encoding an externally inputted analog signal and outputting the encoded analog signal to the VDR system.

Figure 7:
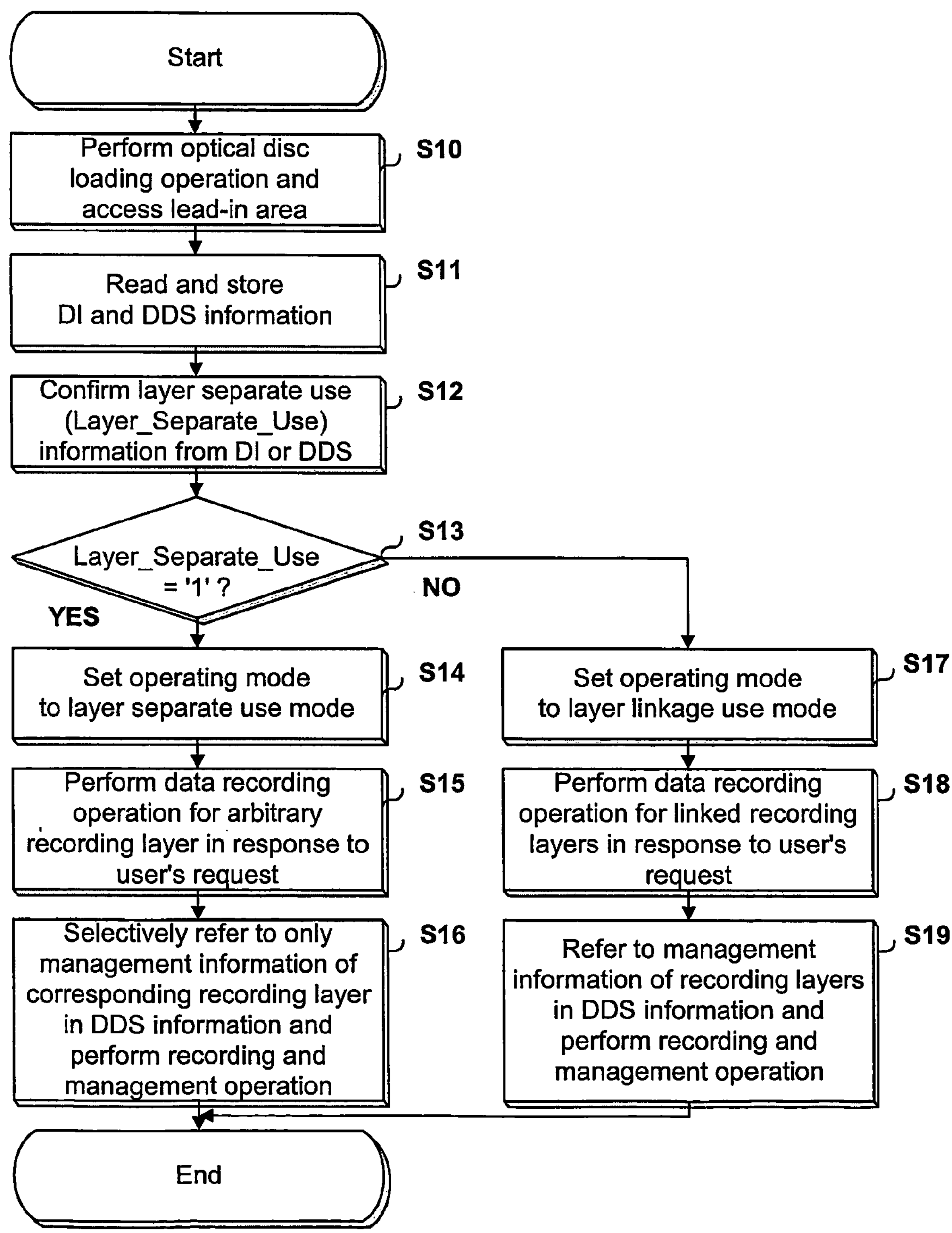
FIG. 7 is a flowchart illustrating a method for recording data on the high-density dual-layer optical disc on the layer-by-layer basis in accordance with the present invention.

FIG. 7 is a flowchart illustrating a method for recording data on the high-density dual-layer optical disc on layer-by-layer basis in accordance with the present invention.

As shown in FIG. 7, where the high-density multi-layer optical disc, e.g., the BD-RE dual layer 200, is inserted and loaded in the VDR system 51 of the optical disc apparatus, a sequence of optical disc loading operations is performed and a lead-in area of the optical disc is accessed at step S10:

Then, the VDR system 51 reads disc information (DI) and disc definition structure (DDS) information recorded in the lead-in area and then stores the read information in an internal memory (not shown) provided in the optical disc apparatus at step S11. As shown in FIG. 5, the DDS information contains spare area management information on the layer-by-layer basis and defect management address (DMA) information.

Then, upon receiving a data recording request from a user, the VDR system 51 searches for and confirms layer separate use information (Layer_Separate_Use) contained and recorded in the DI or the DDS at step S12.

It is determined whether Layer_Separate_Use="1" at step S13. If Layer_Separate_Use="1", the VDR system 51 sets an operating mode to a layer separate use mode for using the recording layers separately at step S14 and records data on only an arbitrary recording layer on the basis of the user's request at step S15.

At this time, the VDR system 51 selectively refers to only management information associated with a corresponding recording layer in the spare area management information on the layer-by-layer basis and the DMA information. If a defect is detected within a data area of the recording layer, data is recorded in only the spare areas for the recording layer, separately assigned to the recording layer, in place of the data area. A sequence of defect management operations for the corresponding recording layer is performed to record and manage a defect list (DFL) entry and DMA information at step S16.

On the other hand, if Layer_Separate_Use="0", the VDR system 51 sets an operating mode to a layer linkage use mode for linking the recording layers and recording data on the linked recording layers at step S17. Then, the VDR system 51 links the recording layers to consecutively record data, corresponding to the data recording request from the user, on the linked recording layers at step S18.

The VDR system 51 refers to all the spare area management information on the layer-by-layer basis and the DMA information contained in the DDS information field. If the defect is detected within the data area of a corresponding recording layer, the VDR system 51 records data using the spare areas separately assigned to one recording layer, or other spare areas separately assigned to another recording layer. Thus, the VDR system 51 performs the defect management operation for the multiple layers to record and manage the DFL and DMA management information at step S19.

For reference, the layer separate use information (Layer_Separate_Use) can be contained and recorded in the DDS information field. A value of the layer separate use information can be arbitrarily set by a user holding the optical disc apparatus or an optical disc manufacturer, or can be fixed to a specified value.

Optionally, the DI containing the layer separate use information can be recorded and managed in only the lead-in area is of the first recording layer.

FIG. 8 is a flowchart illustrating a method for managing the spare areas of the high-density dual-layer optical disc in accordance with the present invention.

As shown in FIG. 8, where the high-density multi-layer optical disc, e.g., the BD-RE dual layer 200, is inserted and loaded in the VDR system 51 of the optical disc apparatus, a sequence of optical disc loading operations is performed and a lead-in area of the optical disc is accessed at step S20.

Then, the VDR system 51 reads disc information (DI) and disc definition structure (DDS) information recorded in the lead-in area and then stores the read information in an internal memory (not shown) provided in the optical disc apparatus at step S21. As shown in FIG. 5, the DDS information contains management information needed for managing a plurality of spare areas on the layer-by-layer basis and defect management address (DMA) information, so management information associated with spare areas separately assigned to each of the recording layers is stored in the memory.

Then, upon receiving a data recording request from the user at step S22, the VDR system 51 performs a data recording operation corresponding to the data recording request at step S23. Further, upon receiving another request, the VDR system 51 performs a sequence of operations corresponding to another request at step S24.

Then, upon detecting a defect within the data area of a corresponding recording layer while the data recording operation is performed in response to the user's request at step S25, the VDR system 51 searches for and confirms spare area full flags contained and recorded in the DDS information field. At this time, the VDR system 51 searches for spare area state information shown in FIG. 5 at step S26.

Then, the spare areas of the respective recording layers are used together or separately on the basis of the confirmed spare area state information (b5b4) at step S27. For example, where "b5b4"=00, the spare area state information indicates that the first inner and outer spare areas assigned to the first recording layer and the second inner and outer spare areas assigned to the second recording layer must be used and managed separately on the layer-by-layer basis. Meanwhile, where "b5b4"=11, the spare area state information indicates that the first inner and outer spare areas assigned to the first recording layer and the second inner and outer spare areas assigned to the second recording layer must be together used and managed.

Further, where "b5b4"=01, the spare area state information indicates that the first inner and outer spare areas assigned to the first recording layer are full. Meanwhile, where "b5b4"=10, the spare area state information indicates that the second inner and outer spare areas separately assigned to the second recording layer are full. In these cases, a sequence of operations performed to generate and output an on-screen display (OSD) image for a message indicating that the spare areas of another recording layer must by used or that a recording error occurs so that the user can confirm the message.

The VDR system 51 generates a DF L entry needed for identifying a cluster associated with a recording unit block (RUB) recorded in a spare area and then manages the generated DFL entry at step S28. Then, the VDR system 51 determines whether the data recording operation has been completed at step S29. If the data recording operation has been completed, the data recording operation is terminated. Otherwise, the data recording operation is continuously performed.

Figure 9:
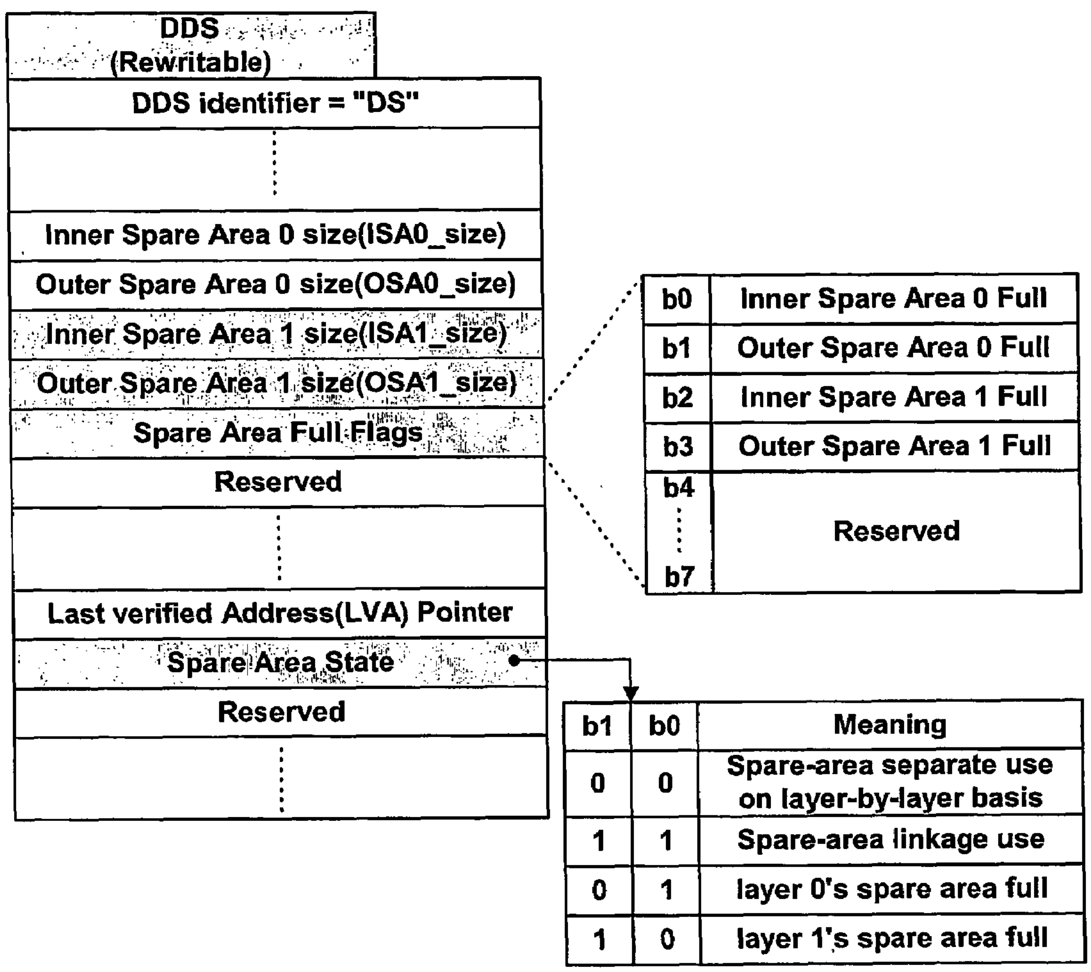
FIG. 9 is another table illustrating the DDS information based on the spare area management method in accordance with the present invention.

FIG. 9 is another table illustrating the DDS information based on the spare area management method in accordance with the present invention. The spare area state information is contained and recorded in the DDS information field. Optionally, the spare area state information can be contained and recorded in another recording field, e.g., a reserved area contained in the DDS information field, different from a field associated with the spare area full flags.

When the defect is detected within the data area and simultaneously data to be recorded in a spare area is real-time audio/video (A/V) data, the spare area state information can be used as information indicating that a data recording operation for the spare area can be omitted. Further, when the defect is detected within the data area and simultaneously data to be recorded in the spare area is computer file data, the spare area state information is used as information indicating that a data recording operation for the spare area can be performed.

For reference, the DDS information can be contained and recorded in the lead-out area as well as the lead-in area.

The method for recording data on the layer-by-layer basis can additionally use the spare area management method. In the flowchart illustrating the data recording method on the layer-by-layer basis as shown in FIG. 7, the VDR system 51 links the recording layers to consecutively record data on the linked recording layers at the above steps S17 to S19 if Layer_Separate_Use="0" as a result of the determination at the above step S13. When the defect is detected within the data area of the corresponding recording layer while the data recording operation is performed in response to the user's request, the above-described spare area management method can be efficiently applied. That is, if the defect is detected, the above steps S18 and S19 shown in FIG. 7 can be replaced with the above steps S23 and S25-S29 shown in FIG. 8.

As apparent from the above description, the present invention provides a high-density multi-layer optical disc, a method for recording data thereon on a layer-by-layer basis, and a method for managing spare areas thereof, which can effectively use and manage a plurality of recording layers formed on the disc and can effectively use and manage a plurality of spare areas separately assigned to each of the recording layers.

The preferred embodiments of the present invention have been disclosed for illustrative purposes. Those skilled in the art will appreciate that various modifications, additions and substitutions are possible, without departing from the scope and spirit of the invention as disclosed in the accompanying claims.

The invention claimed is:

1. A high-density multi-layer optical disc having a plurality of recording layers formed thereon, the optical disc comprising:

at least one spare area assigned to each of the recording layers, respectively, the spare areas being usable to manage one or more defects detected in the recording layers; and at least one specified area contained in at least one of recording layers, the specified area having management information indicating whether use of the spare areas for defect management is restricted to respective assigned layers or is layer-unrestricted.

2. The high-density multi-layer optical disc as set forth in claim 1, wherein said at least one specified area is contained in a lead-in area or lead-out area separately assigned to each recording layer, and the management information is contained and recorded in a field of disc definition structure (DDS) information and/or disc information (DI) recorded and managed in the lead-in area or lead-out area.

3. The high-density multi-layer optical disc as set forth in claim 2, wherein the DDS information comprises spare area management information for indicating how the spare areas are respectively assigned to the recording layers, and a defect address management (DAM) information needed for managing a defect list (DFL), the DDS information being recorded on at least one of the recording layers.

4. The high-density multi-layer optical disc as set forth in claim 3, wherein the spare area management information comprises information indicating a size of an inner spare area or outer spare area respectively assigned to a data area of each recording layer, and spare area full flag information indicating whether or not a corresponding spare area is full.

5. The high-density multi-layer optical disc as set forth in claim 4, wherein the spare area full flag information comprises information of at least two bits indicating whether the spare areas of the recording layers must be used together irrespective of the recording layers or used separately on a layer-by-layer basis.

6. The high-density multi-layer optical disc as set forth in claim 4, wherein the DDS information comprises information of at least two bits indicating whether the spare areas of the recording layers must be used together irrespective of the recording layers or used separately on a layer-by-layer basis, separated from the spare area full flag information indicating whether each of the spare areas is full.

7. The high-density multi-layer optical disc as set forth in claim 2, wherein the DI comprises layer separate use information indicating whether the recording layers must be used together or separately at the time of performing the data recording operation.

8. The high-density multi-layer optical disc as set forth in claim 7, wherein the layer separate use information is recorded and managed as a 1-bit flag.

9. A high-density multi-layer optical disc having a plurality of recording layers formed thereon, comprising:

an inner spare area and outer spare area assigned to each data area, while each data area being assigned to each of the recording layers; and management information, additionally recorded in a lead-in area, indicating whether the spare areas of the recording layers must be used together irrespective of the recording layers or used separately on a layer-by-layer basis.

10. The high-density multi-layer optical disc as set forth in claim 9, wherein the management information is contained and recorded in a field of disc definition structure (DDS) information contained and recorded in the lead-in area.

11. The high-density multi-layer optical disc as set forth in claim 10, wherein the DDS information comprises information indicating a size of the inner spare area or outer spare area respectively assigned to the data area for each recording layer, and spare area full flag information indicating whether or not a corresponding spare area is full.

12. The high-density multi-layer optical disc as set forth in claim 11, wherein the spare area full flag information comprises information of at least two bits indicating whether the spare areas of the recording layers must be used together irrespective of the recording layers or used separately on a layer-by-layer basis.

13. The high-density multi-layer optical disc as set forth in claim 12, wherein the management information indicates that a data recording operation for a spare area can be omitted if data to be recorded in the spare area is audio/video (A/V) data, and that the data recording operation for the spare area can be performed if the data to be recorded in the spare area is predetermined information data other than the A/V data.

14. The high-density multi-layer optical disc as set forth in claim 11, wherein the DDS information comprises information of at least two bits indicating whether the spare areas of the recording layers must be used together irrespective of the recording layers or used separately on a layer-by-layer basis, separated from the spare area full flag information indicating whether each of the spare areas is full.

15. The high-density multi-layer optical disc as set forth in claim 14, wherein the management information indicates that a data recording operation for a spare area can be omitted if data to be recorded in the spare area is audio/video (A/V) data, and that the data recording operation for the spare area can be performed if the data to be recorded in the spare area is predetermined information data other than the A/V data.

16. A method for data performing a defect management operation on a high-density multi-layer optical disc, the method comprising:

(a) reading disc definition structure (DDS) information recorded in at least one specified area of the high-density multi-layer optical disc, and storing the read information in a memory, wherein the disc definition structure information includes control information for indicating whether use of the spare areas for defect management is restricted to respective assigned layers or is layer-unrestricted;

(b) determining whether use of the spare areas for defect management is layer-restricted or is layer-unrestricted based on the control information; and (c) remediating a defect according to a result of the determination.

17. The method as set forth in claim 16, wherein the step (b) is carried out by searching for and confirming the control information contained in a field of the DDS.

18. The method as set forth in claim 16, wherein the step (c) is carried out by referring to the control information contained in the DDS information and only an arbitrary recording layer according to the result of the determination.

19. The method as set forth in claim 16, wherein the step (c) is carried out by referring to the control information contained in the DDS information and for the recording layers according to the result of the determination.

20. The method as set forth in claim 19, wherein the step (c) comprises the steps of:

(c-1) detecting a defect within a data area of the high-density multi-layer optical disc;

(c-2) searching for and confirming spare area management information from the read DDS information, when the defect is detected;

(c-3) determining whether use of the spare areas for defect management is layer-restricted or is layer-unrestricted, according to the confirmed spare area management information; and (c-4) generating a defect list (DFL) entry needed for managing the defect and recording the generated DFL entry to manage the recorded DFL entry, when the data is recorded in an arbitrary spare area.

21. A method for managing spare areas of a high-density multi-layer optical disc, the method comprising:

(a) detecting a defect within a data area of the high-density multi-layer optical disc;

(b) confirming spare area management information read from a lead-in area of the high-density multi-layer optical disc, when the defect is detected; and (c) determining whether spare areas separately assigned to a current recording layer must be used together with other spare areas separately assigned to another recording layer or only the spare areas of the current recording layer must be used separately, according to the confirmed spare area management information.

22. The method as set forth in claim 21, wherein the step (b) is carried out by confirming the spare area management information within disc definition structure (DDS) information read from the lead-in area of the high-density multi-layer optical disc.

23. The method as set forth in claim 21, further comprising the steps of:

(d) generating a defect list (DFL) entry needed for managing the defect and recording the generated DFL entry to manage the recorded DFL entry, when the data is recorded in an arbitrary spare area.

24. A high-density multi-layer optical disc having a plurality of recording layers formed thereon, the optical disc comprising:

a respective inner spare area and a respective outer spare area assigned to each data area, each data area being assigned to a respective one of the recording layers; and management information, additionally recorded in a lead-in area, indicating whether use of the spare areas for defect management is restricted to respective assigned layers or is layer-unrestricted.

25. A method for managing spare areas of a high-density multi-layer optical disc, the method comprising:

(a) detecting a defect within a data area of the high-density multi-layer optical disc;

(b) confirming spare area management information read from a lead-in area of the high-density multi-layer optical disc, when the defect is detected; and (c) determining whether use of spare areas for defect management is restricted to respective assigned layers or is layer-unrestricted according to the confirmed spare area management information.

* * * * *